Sept. 17, 1957 L. J. BISHOP 2,806,252
APPARATUS FOR PRODUCING MOLDED PRODUCTS
Filed March 11, 1953 7 Sheets-Sheet 1

INVENTOR.
LEONARD J. BISHOP
BY
Whittemore, Hulbert & Belknap
ATTORNEYS

Sept. 17, 1957   L. J. BISHOP   2,806,252
APPARATUS FOR PRODUCING MOLDED PRODUCTS
Filed March 11, 1953   7 Sheets-Sheet 2

INVENTOR.
LEONARD J. BISHOP
BY
ATTORNEYS

Sept. 17, 1957   L. J. BISHOP   2,806,252
APPARATUS FOR PRODUCING MOLDED PRODUCTS
Filed March 11, 1953   7 Sheets-Sheet 4

INVENTOR.
LEONARD J. BISHOP
BY
Whittemore, Hulbert & Belknap
ATTORNEYS

Sept. 17, 1957 L. J. BISHOP 2,806,252
APPARATUS FOR PRODUCING MOLDED PRODUCTS
Filed March 11, 1953 7 Sheets-Sheet 6

INVENTOR.
LEONARD J. BISHOP
BY
Whittemore, Hulbert & Belknap
ATTORNEYS

United States Patent Office 2,806,252
Patented Sept. 17, 1957

2,806,252

APPARATUS FOR PRODUCING MOLDED PRODUCTS

Leonard J. Bishop, Birmingham, Mich., assignor to Mechanical Handling Systems, Inc., Detroit, Mich., a corporation of Michigan Application March 11, 1953, Serial No. 341,799

6 Claims. (Cl. 18—26)

This invention relates to apparatus for producing molded products and refers more particularly to an improved mold assembly of the type suitable for use in connection with a conveyor.

In molding certain products, such, for example, as foam rubber cushions or pillows a mold is provided having a base section and a hinged top section. The top section ordinarily has a cover provided with a multiplicity of spaced depending projections which extend into the base section and are of considerable length in order to form the required cellular structure. One objection to molds of the above type having a hinged cover and relatively long projections or core members depending from the cover is that the latter exert considerable stress on the newly molded product during opening of the cover or top mold section. Consequently, opening of the mold is not only difficult but deformation of the product may result.

With the above in view, it is an object of this invention to overcome the above objection by providing a mold assembly having a top or cover section supported in a manner to enable bodily lifting the top section relative to the base section a sufficient distance to remove or substantially remove the projections or core members from the base section before the top section is swung upwardly to its open position.

It is another object of this invention to provide a mold assembly movable along a predetermined path of travel and having means engageable with cams positioned at opposite sides of the path of travel and shaped to successively lift the top section relative to the base section and to swing the top section upwardly relative to the base section.

The foregoing as well as other objects will be made more apparent as this description proceeds especially when considered in connection with the accompanying drawings, wherein:

Figure 6 is an enlarged side elevational view partly in section of the apparatus shown in Figure 1;

Figure 8 is a sectional view taken on the line 8—8 of Figure 6;

Figure 9 is a top elevational view of the mold assembly having certain parts removed for the sake of clearness;

The mold assembly selected for the purpose of illustrating the present invention is of the type used in the manufacture of foam rubber pillows, mattresses and cushions. However, it will be apparent as this description proceeds that the invention is also applicable to practically any mold assembly having a hinged top cover section.

With the above in view, reference is made more in detail to the accompanying drawings wherein the mold assembly is shown as having a base section 20 and a top section 21. The base section 20 (Figures 10 and 14 of the drawings) has a frame 22 comprising a bottom rectangular section 23 and a top rectangular section 24 spaced above the section 23 and integrally secured to the latter at spaced points by vertical members 25. Each of the frame sections are formed of tubular side and end bars having the ends welded or otherwise permanently secured together. Also, the bottom frame section 22 is reinforced by frame bars 26 angularly related with respect to one another and having the opposite ends respectively welded to the end bars of the bottom section 23.

Figure 10:
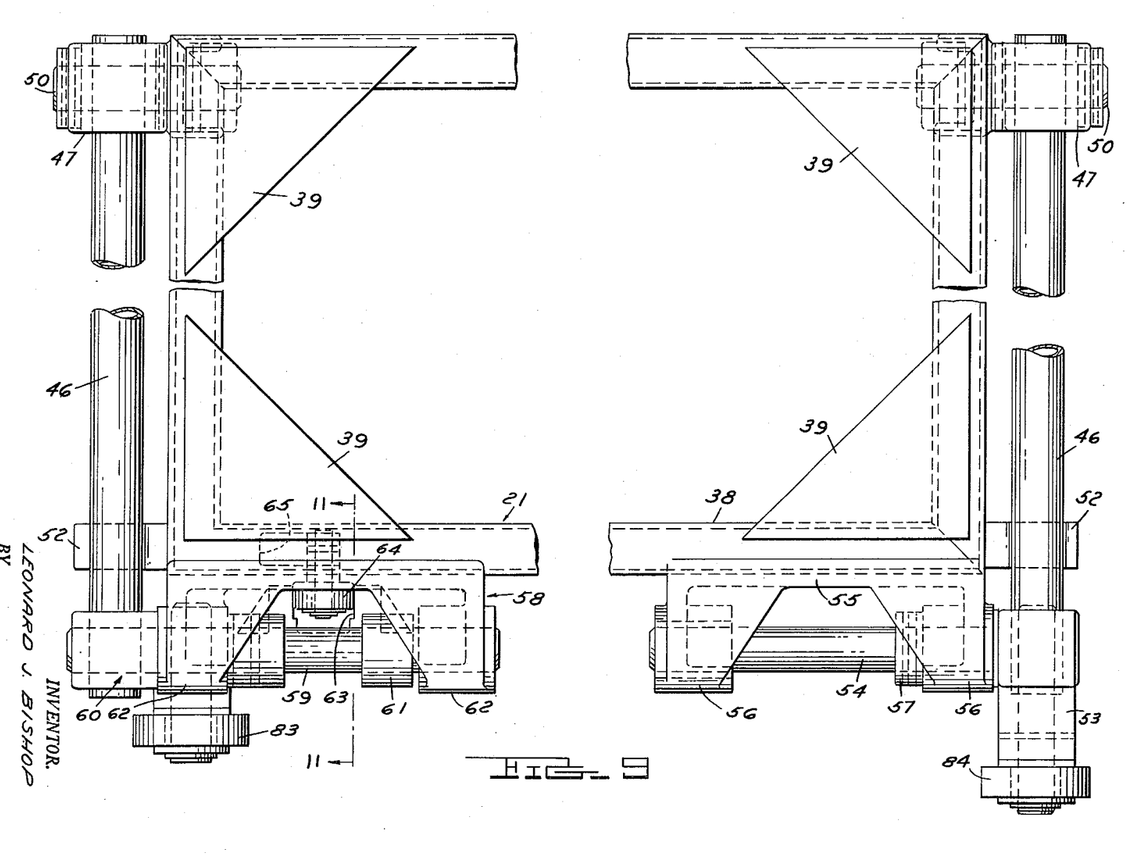
Figure 10 is a cross sectional view taken on the line 10—10 of Figure 7.
Figure 11:
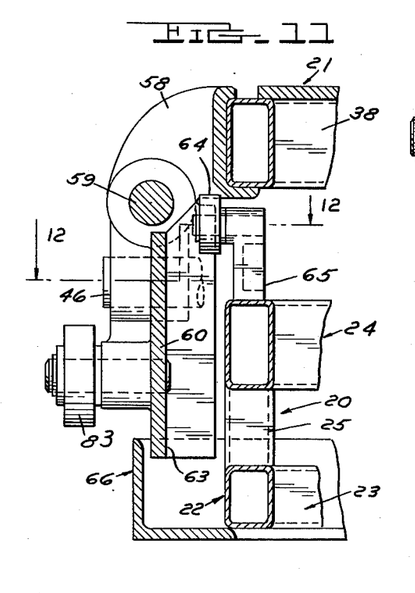

As shown in Figures 6 and 10 of the drawings, the base section 20 of the mold also includes a mold box 27 fashioned to provide a cavity 28 of the desired contour and open at the top of the cavity to enable introducing the material to be molded into the cavity. The box 27 is removably attached to the top frame section 24 and for accomplishing this result angle brackets 29 are respectively secured to opposite end walls of the box 27. Referring again to Figure 10 of the drawings, it will be noted that the flange 30 of the angle bracket 29 on the front wall of the box 27 overlies the front end bar 31 of the top frame section 24 and is secured to the bar 31 by fastener elements 32. The flange 33 of the angle bracket 29 on the rear wall of the box 27 overlies a bar 34 having couplings 35 (Figure 14) at opposite ends respectively slidably mounted on the side bars of the top frame section 24. The flange 33 is attached to the bar 34 by fastener elements 36.

The bar 34 is slidable along the side frame bars of the top section 24 to provide for attaching mold boxes of different sizes to the bottom mold section 20. In this connection, attention is called to the fact that the frame bar 37 at the rear end of the frame section 24 is also fashioned to receive the fastener elements 36 so that in cases where the mold box is of a size which corresponds to the top frame section 24, the bar 34 may be omitted and the flange 33 secured directly to the rear frame bar 37.

The top section 21 of the mold comprises a rectangular frame 38 corresponding in size to the bottom frame section 22 and spaced above the latter. The frame 38 is also constructed of tubular bars having the extremities welded or otherwise rigidly secured together to form an integral structure and, if desired, reinforcing gussets 39 (Figure 13) may be secured to the frame 38 at the corners of the latter.

Figure 13:
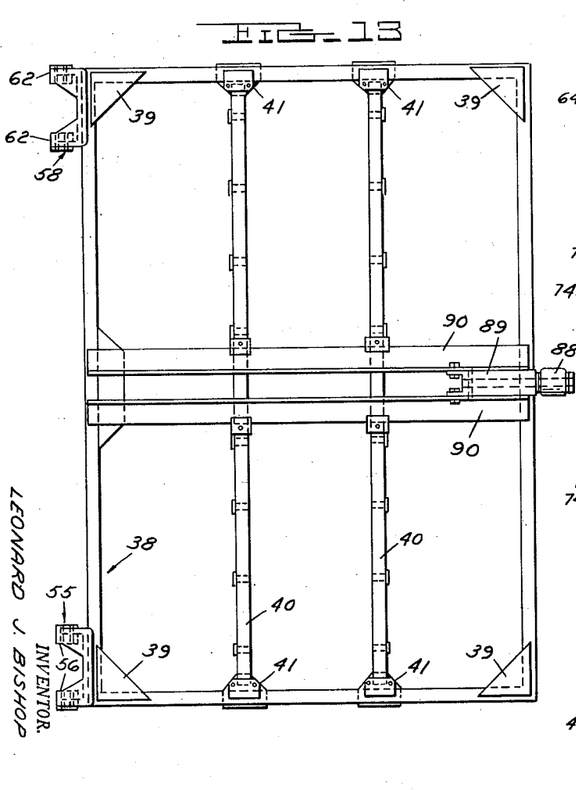
Figure 13 is a top plan view of the top mold section having certain parts removed for the sake of clearness.

As shown particularly in Figures 10 and 13 of the drawings, a pair of laterally spaced tubular frame bars 40 extend between the side bars of the frame 38 and have couplings 41 at opposite ends respectively slidably mounted on the side bars of the frame 38. The frame bars 40 serve as a support for a cover 42 of a size to close the open top of the mold box 27. The cover 42 is secured to the respective frame bars 40 by angle brackets 43 having base flanges secured to the top of the cover 42 by suitable fastener elements and having vertical flanges respectively secured to the frame bars 40 by fastener elements 44. As stated above, the frame bars 40 are adjustable relative to one another in order to accommodate covers of different sizes.

It has been stated above that the mold assembly selected for the purpose of illustration is especially designed for the purpose of molding foam rubber pillows, mattresses, and cushions. In manufacturing products of the above general type, cells of substantial depth are usually molded in the product with adjacent cells in close proximity to one another. For accomplishing this result, a multiplicity of projections or core members 45 are secured to the underside of the cover 42 and project downwardly from the cover into the cavity 28 when the cover is in its closed position on the mold box 27.

It follows from the above that the projections or core members 45 are carried by the cover 42 and are movable as a unit with the latter. In the present instance, the cover 42 is moved out of operative relationship to the mold box 27 by successively lifting the top mold section 21 relative to the base section 20 and thereafter swinging the top section 21 upwardly relative to the base section 20. The extent of upward movement of the top section 21 relative to the base section 20 approximates the length of the longest projection or core member 45 so that the core members are substantially removed from the mold box before the top section 21 is swung upwardly to its fully open position.

For accomplishing the above result, a pair of arms 46 are respectively positioned at opposite sides of the base section 20 as shown in Figure 9 of the drawings and the front ends of the arms 46 are pivotally connected to the base section 20 in a manner to permit vertical swinging movement of the arms. As shown in Figures 8 and 9 of the drawings, a pair of brackets 47 are respectively secured to opposite sides of the base section 20 adjacent the front end of the latter. The brackets 47 have parts 48 which extend between the frame sections 23 and 24 in a manner to assist in holding said sections in proper vertical spaced relationship. In addition, each bracket 47 is formed with laterally spaced ears 49 having aligned openings therethrough for receiving a pivot pin 50. The pins 50 are respectively secured to the brackets 47 and coupling members 51 are journaled on the pins 50 between the ears 49. The coupling members 51 are respectively secured to the front ends of the arms 46. The arrangement is such that the axes of the pins 50 are aligned and extend horizontally at right angles to the arms 46 with the result that the rear ends of the arms 46 are free to swing vertically about the axis of the pins 50.

Figure 1:
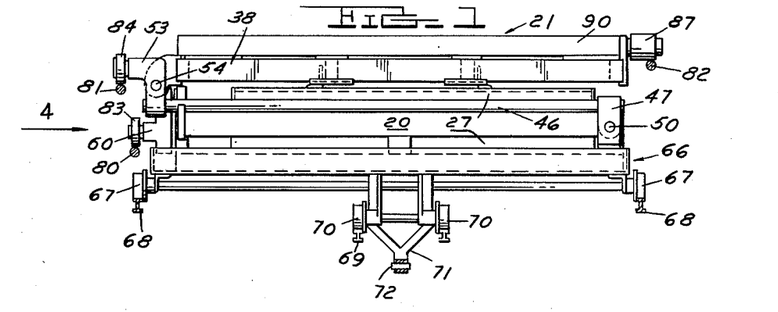
Figure 1 is a side elevational view partly in section of apparatus embodying the features of this invention.
Figure 2:
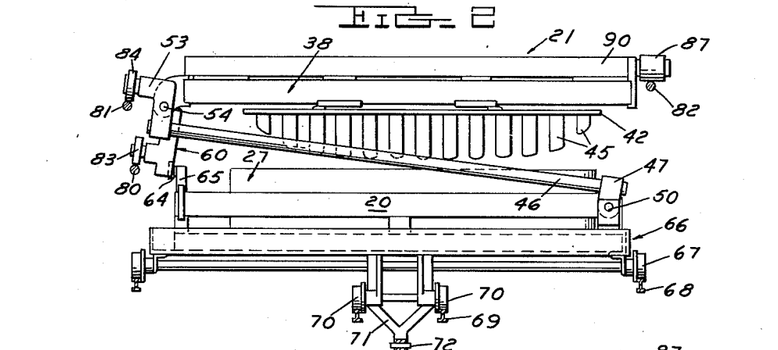
Figure 2 is a side elevational view similar to Figure 1 and showing the top section of the mold in its raised or elevated position with respect to the base section of the mold.
Figure 3:
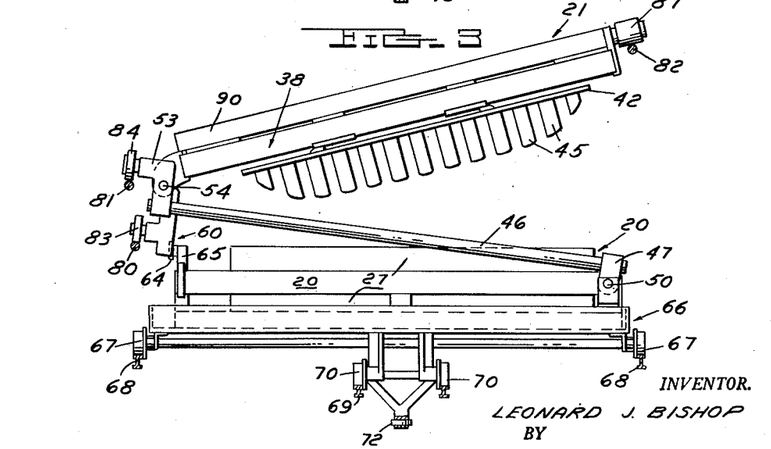
Figure 3 is a side elevational view similar to Figure 2 and showing the top section of the mold swung upwardly with respect to the base section of the mold.
Figure 4:
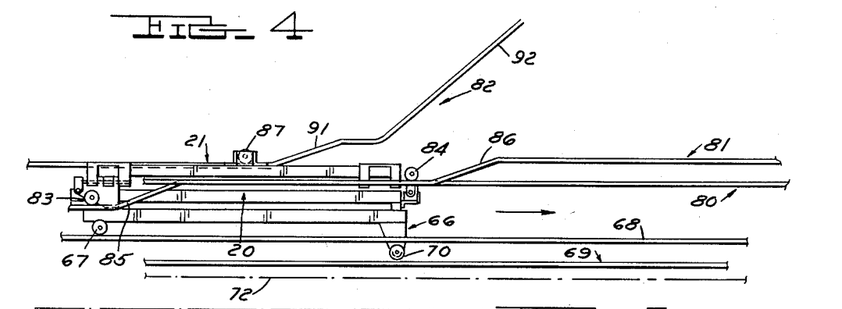
Figure 4 is a diagrammatic end elevational view and showing the cam rails for moving the top section of the mold to the positions theerof shown in Figures 1–3 inclusive.
Figure 5:
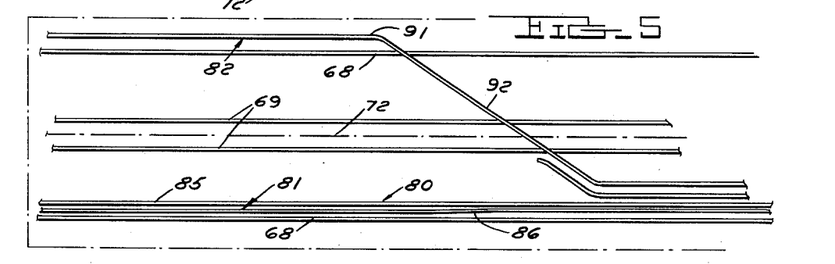
Figure 5 is a diagrammatic top elevational view of the cams for operating the top section of the mold and also showing the rails for supporting the mold for movement along a predetermined path of travel.

In the closed position of the mold cover 42, or in other words, in the lowermost position of the top section 21 of the mold, the arms 46 are respectively supported adjacent the rear end of the mold by upwardly opening saddles 52 respectively secured to the opposite side bars of the top frame section 24. The rear end of one side arm 46 is secured to a bracket 53 having a portion projecting above the side arm 46 and secured to the outer end of a pivot pin 54, as shown in Figures 1–3 inclusive and 7. It will also be noted from Figure 7 of the drawings that the pivot pin 54 extends horizontally at right angles to the adjacent arm 46 beyond the rear bar of the frame 38 and is connected to the rear bar of the frame 38 by a bracket 55. The bracket 55 has ears 56 spaced from each other in the direction of the axis of the pin 54 and apertured to receive said pin. A collar 57 is secured ot the pin 54 in a position to cooperate with the bracket 53 for holding the pin 54 against axial displacement relative to the bracket 55.

Figures 7, 11:
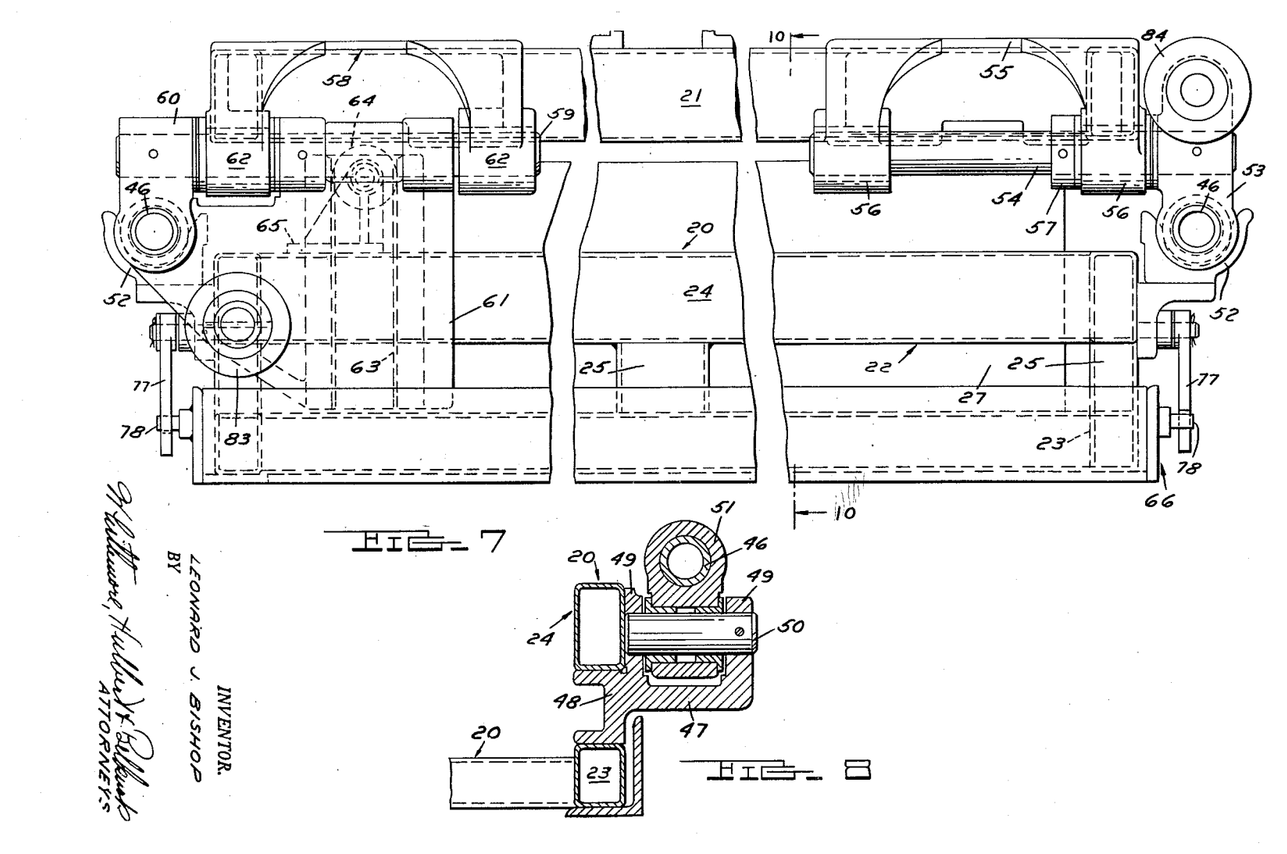
Figure 7 is an enlarged end elevational view of the apparatus shown in Figure 1.
Figure 11 is a sectional view taken on the line 11—11 of Figure 9.

As shown in Figures 7 and 9 of the drawings, a similar bracket 58 is secured to the rear bar of the frame 38 adjacent the opposite side of the top section 21 and a pivot pin 59 is supported by the bracket 58 in axial alignment with the pivot pin 54. The outer end of the pivot pin 59 is supported in a bracket 60 which is secured to the rear end of the other side arm 46. It follows from the above that the pivot arms 54 and 59 cooperate with one another to pivotally support the rear end of the top mold section 21 in a manner to permit vertical swinging movement of the top mold section 21 relative to the bottom mold section 20.

Figure 12:
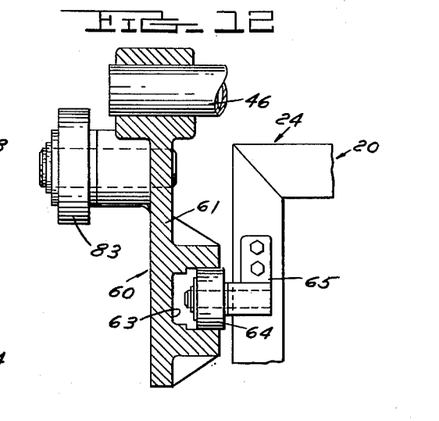
Figure 12 is a sectional view taken on the line 12—12 of Figure 11.

As shown in Figures 7 and 11, the bracket 60 has a portion 61 which extends beneath the pivot pin 59 and is supported on the pivot pin 59 between the ears 62 of the bracket 58. Referring now to Figure 12 of the drawings, it will be noted that the portion 61 is formed with a vertically extending groove 63 and a roller 64 is supported within the groove 63 for rolling engagement with opposite side walls of the grooves. The roller 64 is mounted on the upper end of a bracket 65 having the lower end secured to the rear bar of the top frame section 24 forming a part of the base section 20 of the mold.

With the construction described above, it will be apparent that the top mold section 21 may be raised from the position shown in Figure 1 of the drawings to the position shown in Figure 2 before the top section is swung upwardly to its open position. As the top section 21 is moved bodily upwardly relative to the bottom section 20, the cover 42 of the mold box 27 is also moved upwardly to remove the core members or projections 45 from the cavity 28 so that when the top section 21 is swung upwardly about the axes of the pivot pins 54, 59, there is little or no stress applied to the molded product in the cavity 28 by the core members 45. In this connection, attention is called to the fact that the distance between the pivot pins 50 and the pivot pins 54, 59 or, in other words, the effective lengths of the arms 46, is such that the amount of forward shifting movement of the top mold section 21 resulting from raising the top mold section from the position shown in Figure 1 to the position shown in Figure 2 is very slight so that any stress applied to the molded product in the cavity 28 by the core members 45 is negligible.

Referring now more in detail to Figures 1, 6 and 10 of the drawings, it will be noted that the bottom mold section 20 is removably supported on a carriage 66. In accordance with conventional practice, one end of the carriage is provided with flange wheels 67 at opposite sides thereof for engagement with the rails 68 of a suitable track. The other end of the carriage is suported on a second track 69 by flanged wheels 70 which are suitably mounted on the carriage. The yoke 71 extends downwardly from the carriage between the rails of the track 69 and is engageable by a suitable chain 72 which may be driven to advance the carriage 66 together with the mold along a predetermined path of travel.

Figure 14:
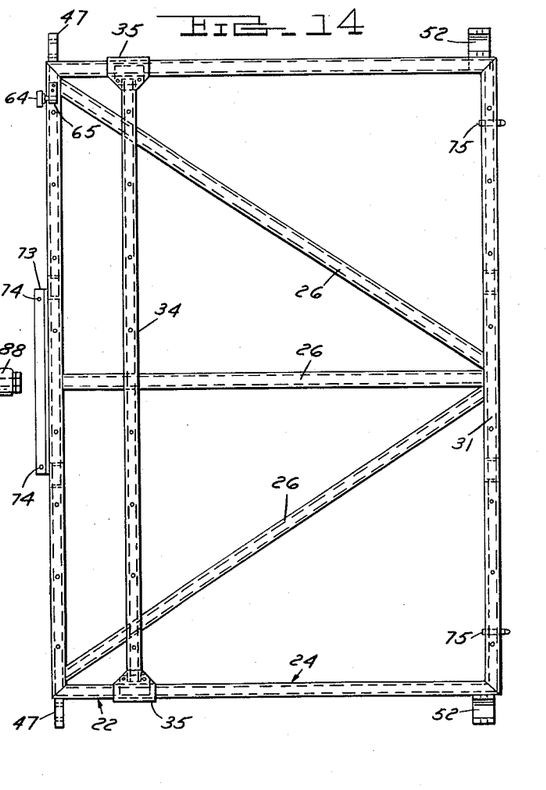
Figure 14 is a top plan view of the bottom mold section also having certain parts removed for the sake of clearness.

Any suitable means may be provided for removably mounting the mold assembly on the carriage 66. As shown in Figures 10 and 14 of the drawings, an angle member 73 is secured to the rear bar of the bottom frame section 23 and vertical pins 74 are secured to the carriage 66 in a position to extend through openings formed in one flange of the bar 73. Thus, the rear end of the base section 20 of the mold is accurately located relative to the carriage 66. Referring now to Figure 6 of the drawings, it will be noted that the front bar of the bottom frame section 23 has spaced horizontally extending pins 75 which respectively extend through openings formed in the adjacent part 76 of the carriage 66. The arrangement is such that during insulation of the mold assembly on the carriage 66, the pins 75 are first extended through their respective openings in the part 76 of the carriage and thereafter the pins 74 on the carriage are engaged in the openings formed in the angle bar 73. Accidental disengagement of the mold assembly from the carriage is prevented by latch members 77 having the upper ends pivoted to opposite sides of the base section 20 (Figure 7) and having the lower ends fashioned to hook over pins 78 projecting laterally from opposite sides of the carriage 66.

The top mold section 21 is raised bodily relative to the base section and thereafter swung upwardly by three cam rails 80, 81 and 82 shown in Figures 1 to 5 inclusive of the drawings. The rails 80 and 81 extend along one side of the path of travel of the carriage 66, and the rail 82 extends along the opposite side of the path of travel of the carriage 66. The rails 80 and 81 are respectively engaged by rollers 83 and 84 respectively mounted on the brackets 60 and 53 carried by the top mold section 21. As shown particularly in Figure 4 of the drawings, the rail 80 has an upwardly inclined section 85 and the rail 81 has a corresponding upwardly inclined section 86 spaced from the section 85 a distance approximating the distance between the rollers 83 and 84. The arrangement is such that the rollers simultaneously engage the respective inclined sections upon movement of the carriage 66 in the direction of the arrow in Figure 4 to bodily lift the rear end of the top mold section 21 to its elevated position shown in Figure 2.

The cam rail 82 is engaged by a roller 87 mounted on the front end of the top mold section 21 intermediate the opposite sides thereof. As shown in Figures 10 and 13 of the drawings the roller 83 is journalled on the front end of a shaft 88 having the rear end secured to a bracket 89. The bracket 89 extends between and is secured to a pair of angle members 90 having the opposite ends respectively secured to the front and rear bars of the frame 38.

Referring again to Figure 4, it will be noted that the rail 82 has an upwardly inclined section 91 corresponding to the inclined cam sections 85 and 86 on the rails 80 and 81 respectively. The inclined cam section 91 is positioned to engage the roller 87 at the same time the rollers 83 and 84 engage their respective inclined cam sections 85 and 86 so that the front end of the top mold section 21 is elevated simultaneously with the rear end. The cam rail 82 has a second upwardly inclined section 92 beyond the section 91 for swinging the top mold section 21 to its uppermost or open position relative to the base mold section 20 upon continued movement of the carirage 66 in the direction of the arrow in Figure 4. It is apparent from the foregoing that upward swinging movement of the top mold section 21 is delayed until the cover 42 is elevated sufficiently to clear or substantially remove the projections or core members 45 from the mold cavity 28. Thus, unobstructed swinging movement of the top mold section to its fully open position relative to the base section 20 is accomplished regardless of the length of the projections or core members 45.

What I claim as my invention is:

1. Apparatus for forming molded products, comprising a mold having a base section and a top section positioned above the base section, a pair of arms respectively positioned at opposite sides of the mold and having the front ends pivoted on the front of the base section of swinging movement relative to the base section in a vertical direction, means pivotally connecting the rear ends of the arms to the rear of the top section permitting swinging movement of the top section in a vertical direction relative to the arms, means for advancing the mold along a predetermined path of travel, and means responsive to movement of the mold along said path of travel for raising said top section relative to said base section while maintaining said top section substantially parallel to said base section and subsequently swinging said top section upwardly about its pivotal connection with said arms and angularly relative to said base section.

2. Apparatus for forming molded products, comprising a mold having a base section and a top section positioned above the base section, a pair of arms respectively positioned at opposite sides of the mold and having the front ends pivoted on the front of the base section for swinging movement relative to the base section in a vertical direction, means pivotally connecting the rear ends of the arms to the rear of the top section permitting swinging movement of the top section in a vertical direction relative to the arms, cooperating slidably engageable means on said base section and top section for guiding vertical movement of the top section relative to the base section, a carriage supporting the mold for movement along a predetermined path of travel, and means at opposite sides of the path of travel engageable with the top section during movement of said mold in one direction along said path of travel for raising the top section relative to the base section while maintaining said top section substantially parallel to said base section and subsequently swinging the top section upwardly about its pivotal connection with said arms and angularly relative to the base section 3. Apparatus for forming molded products, comprising a mold having a base section and a top section positioned above the base section, a pair of arms respectively positioned at opposite sides of the mold and having the front ends pivoted on the front of the base section for swinging movement relative to the base section in a vertical direction, brackets respectively mounted on the rear ends of the arms and pivoted to the rear of the top section permitting swinging movement of the top section in a vertical direction relative to the base section, one of the brackets having a vertically extending guide, a follower mounted on the rear of the base section and engageable with the guide to guide vertical movement of said top section relative to said base section, a carriage supporting the base section of the mold and movable along a predetermined path of travel, a cam follower on the front of the top section, cam followers on said brackets, and cams respectively engageable with the followers upon movement of the carriage along said path of travel and contoured to lift the top section relative to the base section while maintaining said top section substantially parallel to said base section and to subsequently swing the top section upwardly about the pivotal connection with said brackets and angularly relative to the base section.

4. Apparatus for forming molded products, comprising a mold having a base section and a top section positioned above the base section, a pair of arms respectively positioned at opposite sides of the mold and having the front ends pivotally mounted on the front of the base section permitting swinging movement of the arms in a vertical direction, means pivotally connecting the rear ends of the arms to the rear of the top section permitting vertical swinging of the latter relative to said arms, and means for lifting the top section relative to the base section while maintaining said top section substantially parallel to said base section and subsequently swinging said top section upwardly about its pivotal connection to said arms and angularly relative to said base section.

5. The apparatus defined in claim 4 comprising cooperating engageable means on said sections for guiding vertical movement of the top section relative to the base section.

6. The apparatus defined in claim 4 in which the pivotal connection between the arms and the top section comprises brackets respectively mounted on the rear ends of the arms and pivoted to the rear of the top section, one of said brackets having a vertically extending guide, and a follower mounted on the rear of the base section and engageable with said guide for guiding vertical movement of the top section relative to the base section.

References Cited in the file of this patent

UNITED STATES PATENTS

| | | |
|---|---|---|
| 2,128,827 | Killian | Aug. 30, 1938 |
| 2,350,175 | Luxenberger | May 30, 1944 |
| 2,482,418 | Jenkins | Sept. 20, 1949 |
| 2,495,664 | Soderquist | Jan. 24, 1950 |
| 2,508,522 | Kastner | May 23, 1950 |
| 2,695,423 | Pardee et al. | Nov. 30, 1954 |
| 2,732,584 | Bishop | Jan. 31, 1956 |